United States Patent Office 3,584,013
Patented June 8, 1971

3,584,013
SUBSTITUTED CYCLOPENTENYLFURAN DERIVATIVES, INTERMEDIATES THEREOF AND METHODS FOR PRODUCING SAME
George H. Büchi, Cambridge, Mass., Charles Pascal Giannotti, London, Ontario, Canada, Edgar Lederer, Sceaux, Hauts-de-Seine, France, and Hans Wüst, Mattapan, Mass., assignors to Firmenich & Cie, Geneva, Switzerland
No Drawing. Filed July 19, 1968, Ser. No. 745,996
Claims priority, application Switzerland, July 21, 1967, 10,372/67
Int. Cl. C07d 5/32
U.S. Cl. 260—347.8                                7 Claims

ABSTRACT OF THE DISCLOSURE 2-(methyl-methylhydroxymethyl - substituted cyclopentenyl)-3-isopropylfurans are prepared by reduction of corresponding intermediate carbonyl analogs, 2-(methylacetyl-substituted cyclopentenyl)-3-isopropylfurans, said ultimate and intermediate furans both having utility as fragrances in perfume compositions. The intermediate is prepared by cyclization of 2-(1,6-dioxo-2-methylheptyl)-3-iso-propylfuran which, in turn, is prepared by a 7-step synthesis beginning with condensation of isobutyryl-acetaldehyde dimethylacetal with methyl chloroacetate and ending with cleavage of the 5-membered carbon ring of 1,2-dimethyl-2-(3-isopropyl-2-furoyl)-cyclopentanol.

---

The present invention relates to new substituted cyclopentenylfuran derivatives of formula

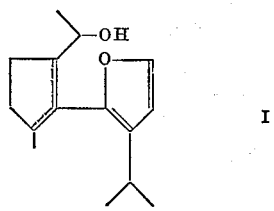

wherein the double bond of the cyclopentene ring is represented by one of the dotted lines. Compounds of Formula I possess valuable odoriferous properties and are useful in the perfume industry. The invention also relates to a process for the preparation of said cyclopentenylfuran derivatives, to new fragrant intermediates used in said process and to a method for preparing them.

The compounds of Formula I are structurally related to some optically active natural constituents of the oil of Geranium Bourbon. This oil, which is obtained from certain species of Pelargonium, for instance *Pelargonium roseum*, has been shown to contain approximately 0.2% of fragrant ketonic constituents, called furopelargones A and B, the structure of which has been established recently by analytical and synthetic procedures (see for instance Tetrahedron 20, 1789 (1964); Czech. chem. comm. 29, 1048 (1964); J. Am. Chem. Soc. 87, 1589 (1965)). The formulae of these two natural products, the cyclopentane ring of which contains no double bond, are shown below

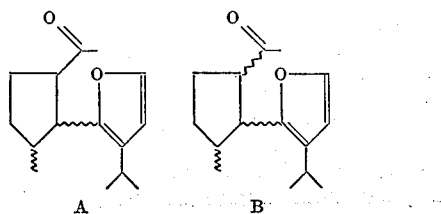

It has now been discovered that the compounds of Formula I possess stronger and more pleasant odoriferous properties than the natural ketonic products A and B. This was entirely unexpected since it is well known that the odour of hydroxy compounds is normally much weaker than the odour of their carbonyl analogs. As a result, compounds of Formula I are useful as fragrances in the preparation of perfumes, perfumed products and artificial essential oils as will be described hereinafter in more detail.

The process for the preparation of compounds of Formula I comprises reducing, by means of a reducing agent, acetyl cyclopentenylfuran derivatives of formula

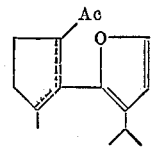

wherein the double bond of the cyclopentene ring is represented by one of the dotted lines.

To carry out the reduction of the above acetyl derivatives, most of the common reagents known to reduce specifically carbonyl functions to hydroxyl functions without affecting olefinic double bonds can be used. Such reagents include for example sodium or potassium borohydride and aluminium alkoxides such as isopropoxide or butoxide. The reduction with an alkali borohydride can be carried out in hydroxylic solvents such as methanol, ethanol, isopropanol and water at temperatures comprised between 0 and 50° C. For convenience, the reaction is preferably carried out with sodium borohydride in aqueous methanol at room temperature.

The hydroxyl derivatives of Formula I contain two centers of asymmetry while their acetyl percursors II contain only one. Reduction of racemic acetyl derivatives II results therefore in epimerization. The diastereoisomeric forms of compounds I can be separated from each other by column chromatography on silica according to usual procedures. Each of the diastereoisomers has valuable odoriferous properties and can be used individually in the perfume industry. However, in practice it is usually simpler to use the mixture of diastereoisomers resulting directly from the reduction, as odoriferous ingredients in perfume compositions.

The acetyl derivatives of Formula II are new substances, optically inactive, which also possess valuable odoriferous properties. According to the invention they can be obtained by the cyclization of 2-(1,6-dioxo-2-methylheptyl)-3-isopropylfuran by means of a cyclization agent.

For the cyclization, a solution of a strong inorganic base such as sodium, potassium or lithium hydroxide in water or in a mixture of water and an alcohol such as methanol, ethanol or isopropanol can be used as a cyclization agent. Other cyclization agents include alkali-metal alkoxides dissolved in common polar solvents i.e. sodium, potassium or lithium methoxide, ethoxide, n-propoxide, isopropoxide, n-butoxide and tert.-butoxide in a solvent such as methanol, ethanol, isopropanol, n-butanol, tert.-butanol, dimethylformamide and ethoxyethanol. A preferred cyclization agent is an ethanol-water solution of sodium hydroxide. The cyclization is preferably carried out at the reflux temperature of the above solution for a few hours, i.e. 2 to 10 hours.

The acetyl derivatives II form during the cyclization in a weight ratio of approximately 85:15. The more abundant isomer has the double bond of the cyclopentene ring placed in a β-γ position relative to the carbonyl function; the other one has it in an α-β position. According to the invention, the two isomers can be reduced together or separately. They can be separated, prior to the reduction, by preparative vapor phase chromatography or by column chromatography on silica according to usual methods.

The new substituted hydroxyl cyclopentenylfuran derivatives of Formula I and their carbonyl precursors of Formula II are particularly useful for enhancing and reinforcing the top note of perfume compositions. They are particularly useful when added to floral-type and chypre-type perfume compositions or synthetic essential oils and are advantageously used in proportions of 0.1–5% based on the total weight of a perfume composition, 1 to 3% being a preferred range. These figures are not absolute limits since the said cyclopentenyl derivatives can also be used in lower or higher proportions depending on the effect sought. The various isomeric forms of compounds I and II can be used individually in the perfume industry; however, in practice very good results are obtained with mixtures of two or more of the above isomeric forms. For example, it is often convenient to reduce a mixture of the two position isomers II and to use the resulting mixture of the two diastereoisomeric pairs of I as an ingredient for the preparation of perfume compositions. This will become apparent in the examples described hereinafter.

The intermediate X which is a new compound can be prepared, according to the invention, by the following sequence of reactions:

(a) Isobutyrylacetaldehyde dimethylacetal III, prepared according to the method described in J. Am. Chem. Soc. 75, 2050 (1953) is condensed with methyl chloroacetate in the presence of sodium methoxide according to the conditions of Darzens reactions to give the epoxyester acetal IV (see scheme below).

(b) The epoxyester acetal IV is converted to 2-methoxycarbonyl-3-isopropylfuran V by heating according to the method described in J. Org. Chem. 21, 102 (1956).

(c) Alkaline hydrolysis of V according to current methods gives, after neutralization, the corresponding free acid; the latter is converted to the corresponding acid chloride VI by any of the usual acid chlorinating procedures. The use of thionyl chloride is preferred.

(d) Acid chloride VI, treated with a cyclic enamine of cyclopentanone according to J. Am. Chem. Soc. 85, 207 (1963) gives, after subsequent acid hydrolysis of the reaction product, 2-(3-isopropyl-2-furoyl)-cyclopentanone VII. Cyclic enamines derived from common cyclic secondary amines such as pyrrole, piperidine and morpholine can be used in this step. The enamine derived from morpholine is preferred. Subsequent hydrolysis can be carried out by using diluted aqueous solutions of common mineral acids such as HCl, H$_2$SO$_4$ and H$_3$PO$_4$. Diluted HCl is preferred.

(e) The 2-position of the substituted cyclopentanone VII is methylated to give 2-methyl-2-(3-isopropyl-2-furoyl)-cyclopentanone VIII, by treatment of VII with consecutively a strong inorganic or metal organic proton abstractor, then with a common methylating agent according to usual methods. As a proton abstractor, strong bases such as sodium hydride, sodamide, lithium diisopropylamide of phenyl lithium can be used; as methylating agents, substances such as methyl iodide, methyl sulfate or methyl phosphate can be used. Sodium hydride and methyl iodide are preferably used.

(f) The diketone VIII is then subjected to a Grignard reaction with methylmagnesium iodide under the usual conditions and furnishes, after usual hydrolysis of the Grignard addition compound, 1,2-dimethyl-2-(3-isopropyl-2-furoyl)-cyclopentanol IX.

(g) The 5-membered carbon ring of the cyclopentanol derivative IX is cleaved by alkali and gives the diketone derivative X. For the above cleavage, common strong alkalies e.g. sodium or potassium hydroxide in aqueous alcohols such as methanol, ethanol or isopropanol can be used.

The scheme below summarises paragraphs (a) to (g) and illustrates the preparation of intermediate X. In the scheme, Me represents a methyl substituent.

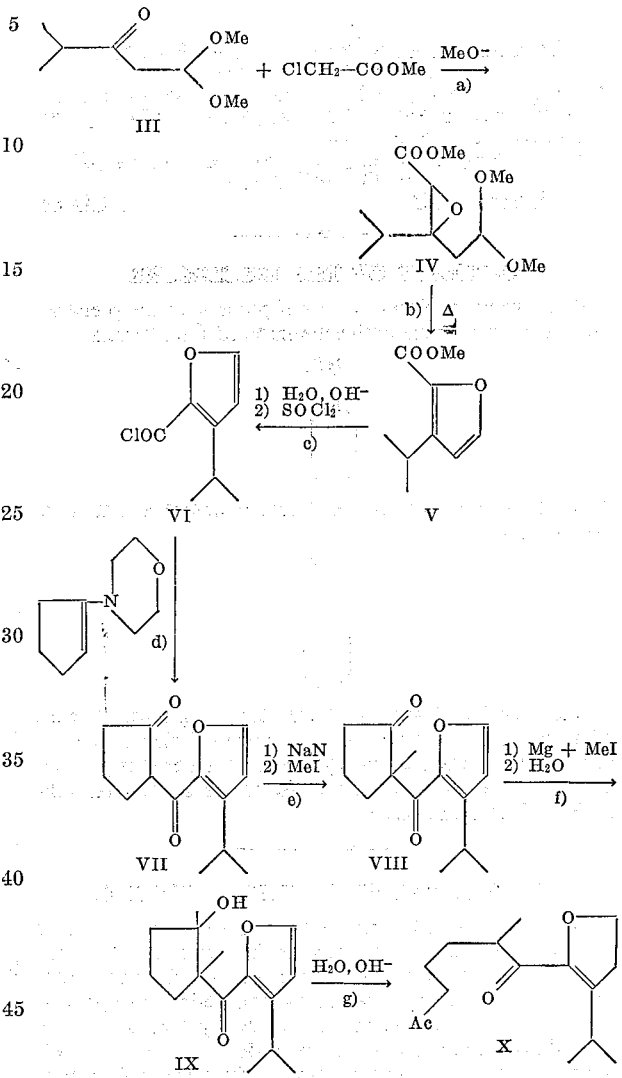

The following examples in which the temperatures are indicated in degrees centigrade illustrate the invention in a more detailed manner.

EXAMPLE 1

Preparation of 2-[2-methyl-5-(1-hydroxyethyl)-1-cyclopentenyl]-3-isopropyl-furan (a) Methyl 5-dimethoxy-2,3-epoxy-3-isopropylvalerate IV.—A 500 ml. 3-necked flask was equipped with a stirrer, a thermometer inserted through an adapter with a side arm connected to a source of N$_2$, and a 50-ml. Erlenmeyer addition flask. The apparatus was dried with a free flame in a slow stream of N$_2$ and subsequent operations were conducted in an N$_2$ atm. A mixture of isobutyrylacetaldehyde dimethylacetal (21.3 g., 133 mmoles), methyl chloroacetate (23.2 g., 213 mmoles), and dry ether (100 ml.) was placed in the reaction vessel and the addition flask was charged with NaOMe (11.5 g., 213 mmoles). The soln. was cooled in a Dry Ice-acetone bath to −10° and the NaOMe was added gradually at such a rate that a temperature below −5° could be maintained (approx. 30 min.). The mixture was stirred for an additional two hours and then allowed to come to room temperature overnight. It was then cooled again to 0° and made slightly acidic by addition of glacial AcOH (1.5 ml.) in water (20 ml.). The ether was decanted, and the residual slurry was extracted three times with ether. The combined ether solns. were washed in a separatory funnel with 20 ml. sat. NaClaq to which was added 0.4 g. portions of NaHCO₃ until the washings were no longer acidic. After each bicarbonate addition, the mixture was shaken for at least one min. before a test for acidity was made. Finally, the ether phase was washed with sat. NaClaq and dried over $Na_2SO_4$. Distillation of the solvents left 28 g. of crude glycidic ester IV.

(b) Methyl 3-isopropyl-2-furoate V.—The crude ester IV was placed in a distillation flask and heated in an oil bath. When the bath temperature reached 150°, MeOH began to distill. Heating was continued until the production of MeOH had ceased. After the heating bath had been allowed to cool, the product was distilled to give 14.6 g. (65%) of V, B.P. 97° (12 mm.).

An analytical sample was obtained by esterification of the free acid with diazomethane. It had IR bands ($CHCl_3$) at 1715 and 1600 cm.$^{-1}$ and UV absorption (EtOH) at 253 mμ (ε 3,830). NMR ($CCl_4$) 7.4 (1 H, d, J=2 c./s.); 6.4 (1 H, d, J=2 c./s.); 3.85 (3 H, s); 3.6 (1 H, septet, J=8 c./s.); 1.2 (6 H, d, J=8 c./s.).

Calculated for $C_9H_{12}O_3$ (percent): C, 64.27; H, 7.19. Found (percent): C, 64.15; H, 7.03.

(c) 3-isopropyl-2-furoyl chloride VI.—A mixture of V (10.5 g., 62 mmoles) and 20% NaOHaq (25 ml.) was heated under reflux for two hours. The soln. was cooled and acidified with concentrated HCl while stirring vigorously. The product was collected by suction filtration, washed with water and dried in a desiccator. The acid obtained (8.02 g., 84%) had M.P. 94–97°. A sample was purified for analysis by recrystallization from hexane. It had M.P. 96–98°; IR absorptions (KBr) 1680, 1580 cm.$^{-1}$; NMR ($CCl_4$) 12.4 (1 H, s.); 7.5 (1 H, d, J=2 c./s.); 6.45 (1 H, d, J=2 c./s.); 3.7 (1 H, septet, J=7 c./s.).

Calculated for $C_8H_{10}O_3$ (percent): C, 62.32; H, 6.54. Found (percent): C, 62.53; H, 6.60.

A mixture of the free acid (15.1 g., 98 mmoles), $SOCl_2$ (13.1 g., 110 mmoles) and dry benzene (50 ml.) was allowed to reflux for four hours. After removal of the solvent in vacuo, the residue was distilled to yield 15.1 g. (87.5%) of the acid chloride, B.P. 108° (17 mm.).

(d) 2-(3-isopropyl-2-furoyl)-cyclopentanone VII.—To a soln. of cyclopentanone-morpholine enamine (13.8 g., 90 mmoles) and $Et_3N$ (9.1 g., 90 mmoles) in EtOH-free $CHCl_3$ (100 ml.) was added dropwise, at 0°, the acid chloride (15.1 g., 87 mmoles) diluted with $CHCl_3$ (30 ml.). The reaction mixture was kept under $N_2$ and left overnight at room temperature. It was then added to 10% HCl (30 ml.) and after stirring at reflux temperature for two hours it was cooled and the $CHCl_3$ layer was separated and washed consecutively with 5% HCl, water, 5% $NaHCO_3$aq, water, dried over $Na_2SO_4$, and evaporated. Distillation of the remaining oil gave 16.5 g. (86%) of VII, B.P. 97–100° (0.01 mm.); $n_D^{25}$ 1.5576; IR absorptions ($CHCl_3$) at 1740, 1655 (broad), 1610 (broad) cm.$^{-1}$; UV absorptions (EtOH) 235 (ε 2,950), 279 (ε 8,700), 350 mμ (ε 10,500); (dil. NaOH) 232 (ε 5,600); 277 (ε 6,100), 346 mμ (ε 12,000).

Calculated for $C_{13}H_{16}O_3$ (percent): C, 70.89; H, 7.32. Found (percent): C, 70.84; H, 7.26.

(e) Methylation of diketone VII.—Diketone VII (16.1 g. 73 mmoles) in dry DMF (25 ml.) was added over a period of 45 min. to a stirred suspension of NaH (1.92 g., 80 mmoles) in DMF (50 ml.). The reaction was preformed under $N_2$ at room temperature. After $H_2$ evolution had ceased (1 hour) MeI (11.4 g., 80 mmoles) in DMF (20 ml.) was added in the course of 15 min. and stirring was continued at room temperature for one hour. The resulting mixture was poured onto ice and extracted with ether twice. The organic layers were washed with water, dried over $Na_2SO_4$, and evaporated.

The solid residue was crystallized from $CHCl_3$-hexane to give 13.2 g. (77%) of VIII, M.P. 103–108°. A sample recrystallized from EtOAc had M.P. 106–108°; IR absorptions ($CHCl_3$) at 1735, 1660, 1575 cm.$^{-1}$; NMR ($CCl_4$), 7.2 (1 H, d, J=2 c./s.); 6.3 (1 H, d, J=2 c./s.); 3.6 (1 H, septet, J=7 c./s.); 1.5–2.7 (6 H, m); 1.25 (3 H, s.); 1.15 (6 H, d, J=7 c./s.); UV absorptions (EtOH) 276 mμ.

Calculated for $C_{14}H_{18}O_3$ (percent): C, 71.77; H, 7.74. Found (percent): C, 72.19; H, 7.86.

(f) 1,2 - dimethyl-2-(3-isopropyl-2-furoyl)-cyclopentanol IX.—The Grignard reagent prepared from MeI (9.2 g., 65 mmoles) and Mg (1.46 g., 60 mg. atoms) in anhydrous ether (50 ml.) was added over a period of one hour at 20° to a soln of VIII (12.7 g., 54 mmoles) in ether (300 ml.). A yellow oil precipitated rapidly but stirring was continued at reflux for one hour; the mixture was then cooled and added to sat. $NH_4$Claq (50 ml.). The organic layer was separated, washed with water, dried over $Na_2SO_4$ and evaporated. From a soln. of the remaining oil in hexane, starting material (2.3 g.) crystallized on cooling to −20°. The mother liquors were concentrated to give 11.0 g. of crude hydroxy-ketone IX; IR absorptions ($CHCl_3$) at 3580, 1640, 1510 cm.$^{-1}$.

(g) 2 - (1,6 - dioxo-2-methylheptyl) - 3 - isopropylfuran X.—A soln. of crude IX (11.0 g.) in EtOH (150 ml.) and 5% NaOHaq (60 ml.) was refluxed under $N_2$ for two hours. The alcohol was partly removed in vacuo and the resulting mixture extracted with pentane twice. Organic layers were washed with water, dried over $Na_2SO_4$ and evaporated. The residue was distilled to give 8.35 g. (75% based on 10.4 g. of VIII) of X, B.P. 118–125° (0.2 mm.). A pure sample was obtained by chromatography on silicic acid using a mixture of hexane and EtOAc as eluent. It had B.P. 122° (0.1 mm.); $n_D^{25}$ 1.4898; IR absorptions ($CHCl_3$) at 1715, 1665, 1575 cm.$^{-1}$; NMR ($CCl_4$): 7.2 (1 H, d, J=2 c./s.); 6.3 (1 H, d, J=2 c./s.); 3.6 (1 H, septet, J=7 c./s.); 3.3–1.3 (7 H, m); 2.0 (3 H, s); 1.15 (6 H, d, J=7 c./s.); 1.1 (3 H, d, J=6 c./s.).

Calculated for $C_{15}H_{22}O_3$ (percent)): C, 71.97; H, 8.86%. Found (percent): C, 72.19; H, 8.75.

(h) 2 - (2 - methyl - 5 - acetyl - 1-cyclopentenyl)-3-isopropylfuran and 2 - (5 - methyl-2-acetyl-1-cyclopentenyl) - 3 - isopropylfuran II.—A soln. of X (3.17 g.) in 25 ml. of 5% NaOHaq (water:EtOH 1:1) was allowed to reflux under $N_2$ for seven hours. The mixture was diluted with water and extracted twice with pentane. The organic layers were washed to neutrality, dried over $Na_2SO_4$ and evaporated. Gas chromatography of the residue indicated the presence of some starting material X and the two isomeric acetyl derivatives II (12% and 88% respectively). For separation on a preparative scale the residue (2.9 g.) was chromatographed on silicic acid (180 g.). Elution with hexane containing 2.5% EtOAc gave 55 mg. of II with the double bond in α-β to the Ac function. Later fractions eluted with the same mixture of solvents yielded 1.58 g. of II with the double bond in β-γ to the Ac function.

Pure α,β-unsaturated ketone II obtained by distillation, B.P. ~90° (0.1 mm.) had IR absorptions ($CHCl_3$) at 1650, 1575, 1490 cm.$^{-1}$; UV absorptions at 224 (ε 10,000) and 308 mμ (ε 5,650). NMR ($CCl_4$) 7.25 (1 H, d, J=2 c./s.); 6.25 (1 H, d, J=2 c./s.); 3.4–1.0 (6 H, m); 1.8 (3 H, s); 1.18 (3 H, d, J=7 c./s.); 1.1 (3 H, d, J=7 c./s.); 0.95 (3 H, d, J=7 c./s.). Mass spectrum m/e 232 (parent peak), m/e 189 (base peak).

The β,γ-unsaturated ketone II was also purified by distillation, B.P. ~90° (0.1 mm.). IR absorptions ($CHCl_3$) 1700, 1510 cm.$^{-1}$; UV absorption (EtOH) 252 mμ (ε 9,650); NMR ($CDCl_3$) 7.3 (1 H, d, J=2 c./s.); 6.3 (3 H, d, J=2 c./s.); 3.9 (1 H, m); 2.6 (1 H septet, J=7 c./s.); 2.3–1.0 (4 H, m); 1.92 (3 H, s); 1.8 (3 H, s broad); 1.2 (3 H, d, J=7 c./s.); 1.1 (3 H, d, J=7 c./s.). Mass spectrum m/e 232 (parent peak); 189 (base peak).

Calculated for $C_{15}H_{20}O_2$ (percent): C, 77.55; H, 8.68. Found (percent): C, 77.25; H, 8.73.

(i) 2 - (2-methyl-5-(1-hydroxyethyl)-1-cyclopentenyl)-3-isopropylfuran (compound I with β-γ unsaturation); diastereoisomers a and b.—To a soln. of the β-γ unsaturated ketone II (469 mg.) in 80% MeOH (12 ml.) was added NaBH₄ (200 mg.). The mixture was stirred for one hour at room temperature, then it was diluted with water and extracted twice with pentane. The organic layers were washed with water and dried over Na₂SO₄. Evaporation of the solvent left an oil (464 mg.) which showed two peaks in the ratio of 43:57 on VPC using a Carbowax 2 ft.-column at 170°. The retention times were 21 and 29 min. respectively. The two alcohols were quantitatively separated by silicic acid chromatography using a mixture of hexane (95%) and EtOAc (5%) as eluent.

Alcohol Ia (less polar): B.P. ~90° (0.05 mm.); $n_D^{25}$ 1.5096; IR absorptions (CHCl₃) 3560, 3420 cm.⁻¹; UV absorption (EtOH) 247 mμ (ε 10,000). NMR (CDCl₃) 7.3 (1 H, d, J=2 c./s.); 6.3 (1 H, d, J=2 c./s.); 3.8 (1 H, d of q, J=7 c./s. and 3 c./s.); 3.3–1.0 (6 H, m); 1.75 (3 H, s, broad); 1.55 (1 H, s) (disappears on exchange with D₂O); 1.3–1.0 (9 H, 6 sharp lines). Mass spectrum: m/e 234 (parent peak); m/e 189 (base peak).

Calculated for $C_{15}H_{22}O_2$ (percent): C, 76.88; H, 9.46. Found (percent): C, 76.93; H, 9.43.

Alcohol Ib (more polar): B.P. ~90° (0.05 mm.); $n_D^{27}$ 1.5137; IR absorptions (CHCl₃) 3590, 3560, 3430 cm.⁻¹; UV absorption (EtOH) 247 mμ (ε 8,900). NMR (CDCl₃); 7.3 (1 H, d, J=2 c./s.); 6.3 (1 H, d, J=2 c./s.); 3.7 (1 H, quintet, J=7 c./s.); 3.3–1.0 (6 H, m); 1.7 (3 H, s, broad); 1.65 (1 H, s) (disappears on exchange with D₂O); 1.2 (3 H, d, J=7 c./s.); 1.05 (3 H, t, J=7 c./s.). Mass spectrum: m/e 234 (parent peak); m/e 189 (base peak).

Calculated for $C_{15}H_{22}O_2$ (percent): C, 76.88; H, 9.46. Found (percent): C, 76.76; H, 9.50.

EXAMPLE 2

Preparation of 2-(5-methyl-2-(1-hydroxyethyl)-1-cyclopentenyl) - 3-isopropylfuran (compound I with α-β unsaturation); diastereoisomers a and b The α-β unsaturated ketone II obtained according to Example 1, paragraph h, was reduced with NaBH₄ according to the method described in Example 1, paragraph i. After chromatography on silicic acid the corresponding diastereoisomeric alcohols a and b were obtained in nearly quantitative yield. B.P. 95° (0.05 mm.). These two alcohols possess valuable odoriferous properties and are useful in the perfume industry.

EXAMPLE 3

Preparation of the mixture of 2-[2-methyl-5-(1-hydroxyethyl) - 1 - cyclopentenyl]-3-isopropylfuran and 2-[5-methyl-2-(1-hydroxyethyl)-1-cyclopentenyl]-3-isopropylfuran; mixture of compounds I with unsaturations in α-β and β-γ (two disatereoisomeric pairs)

The mixture (12:88) of 2-(5-methyl-2-acetyl-1-cyclopentenyl)-3-isopropylfuran (compound II with α-β unsaturation) and 2-(2-methyl-5-acetyl-1-cyclopentenyl)-3-isopropylfuran (compound II with β-γ unsaturation) resulting from the cyclization of diketone X described in Example 1 under paragraph h was reduced directly with NaBH₄ in aqueous methanol according to the method described in Example 1, under paragraph i.

From 6 g. of the above mixture, 5.4 g. of Compound I were obtained as a mixture of two pairs of disastereoisomers which were not separated. This mixture could be directly used for the preparation of perfumed materials.

The following examples illustrate the use of the products of the invention as ingredients for the preparation of perfumes.

EXAMPLE 4

A perfume composition with a floral-woody note was prepared by mixing the following ingredients (parts by weight):

| | |
|---|---:|
| Bergamot oil | 6 |
| Ylang extra | 8 |
| Hydroxycitronellal | 10 |
| α-Isomethylionone | 10 |
| Citronellol | 4 |
| Geraniol | 2 |
| Phenylethyl alcohol | 6 |
| Amylicinnamaldehyde | 2 |
| Benzyl acetate | 10 |
| Eugenol | 1 |
| Undecanol at 10% [1] | 3 |
| Dodecanol at 10% [1] | 1 |
| Styrax, purified, at 50% | 3 |
| Heliotropin | 3 |
| Coumarin | 4 |
| Musk ketone | 5 |
| Musk ambrette | 2 |
| Vetiveryl acetate | 4 |
| Santalol | 2 |
| *Cistus labdanum*, purified, at 50% [1] | 4 |
| aVnillin at 1% [1] | 4 |
| Jasmine absolute | 2 |
| Rose absolute | 1 |
| | 97 |

[1] In diethyl phthalate.

When 3 g. of the mixture of compounds II obtained as described in Example 1, paragraph h, was added to 97 g. of the above composition, the top note was markedly increased and more natural.

EXAMPLE 5

A floral-type perfume composition was prepared by mixing the following ingredients (parts per weight):

| | |
|---|---:|
| Bergamot | 6 |
| Ylang extra | 8 |
| Hydroxycitronellal | 10 |
| α-Isomethylionone | 9 |
| Citronellol | 5 |
| Geraniol | 3 |
| Phenylethyl alcohol | 9 |
| Trichlormethyl-phenylcarbinyl acetate | 1 |
| Linalol | 1 |
| Nonanol at 10% [1] | 1 |
| Undecanol at 10% [1] | 1 |
| Benzyl salicylate | 3 |
| Benzyl acetate | 9 |
| Amylcinnamaldehyde | 3 |
| Heliotropin | 2 |
| Musk ketone | 6 |
| Musk ambrette | 2 |
| Pentadecanolide at 10% [1] | 3 |
| Irone | 1 |
| Siam benzoin tears at 10% [1] | 1 |
| Phenylethyl phenylacetate | 1 |
| Portugal | 1 |
| Dedecanel at 10% [1] | 1 |
| Vanillin at 10% [1] | 1 |
| Vetiveryl acetate | 4 |
| Oak moss absolute at 10% [1] | 3 |
| Rose absolute | 2 |
| | 97 |

[1] In diethyl phthalate.

When 3 g. of compound I, as the mixture of isomers obtained as described in Example III, is added to 97 g.

of the above composition, the top note was improved and more natural.

EXAMPLE 6

A Chypre-type perfume composition was prepared by mixing the following ingredients (parts per weight):

| | |
|---|---|
| Bergamot | 7 |
| Portugal | 2 |
| Ylang extra | 6 |
| Hydroxycitronellal | 8 |
| α-Isomethylionone | 8 |
| Citronellol | 3 |
| Geraniol | 2 |
| Linalol | 1 |
| Phenylethyl alcohol | 4 |
| Benzyl acetate | 9 |
| Hexylcinnamaldehyde | 3 |
| Isojasmone at 10%[1] | 3 |
| Indole at 1%[1] | 2 |
| Oak moss absolute at 50%[1] | 4 |
| Styrallyl acetate at 10%[1] | 4 |
| Undecalactone at 10%[1] | 1 |
| Styrax, purified, at 50%[1] | 5 |
| Labdanum, purified, at 50%[1] | 2 |
| Cedrol | 6 |
| Vetiveryl acetate | 3 |
| Patchouli | 1 |
| Santal oriental | 2 |
| Coumarin | 3 |
| Vanillin at 10%[1] | 1 |
| Musk ambrette | 1 |
| Musk ketone | 5 |
| Bulgarian rose | 1 |
| | 97 |

[1] In diethyl phthalate.

When 3 g. of 2-[2-methyl-5-(1-hydroxyethyl)-1-cyclopentenyl]-3-isopropylfuran I (diastereoisomer a) prepared according to the method described in Example 1, paragraph i, was added to 97 g. of the above composition, the top note was improved and more natural. Similar results were obtained when disastereoisomer a was replaced by diastereoisomer b.

In the foregoing examples the abbreviations used have the meaning described hereinafter.

Et=ethyl
Me=methyl
VPC=vapor phase chromatography
Ac=acetyl
IR=infra-red
UV=ultra-violet
NMR=nuclear magnetic resonance
aq=aqueous
soln.=solution
sat.=saturated
dil.=diluted
DMF=dimethylformamide
mm.=millimeters of Hg

We claim:
1. As a composition of matter, a cyclopentylfuran derivative of formula

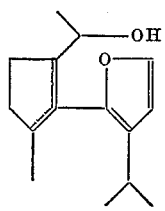

I wherein the double bond of the cyclopentene ring is represented by one of the dotted lines.

2. As a composition of matter, an acetylcyclopentenylfuran derivative of formula

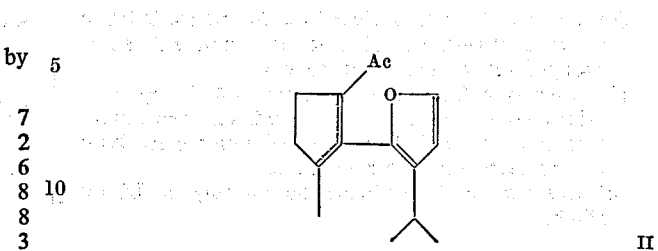

II wherein the double bond of the cyclopentene ring is represented by one of the dotted lines.

3. A perfume composition comprising as an odoriferous ingredient at least one member selected from the group consisting of cyclopentenylfuran derivatives of formulae

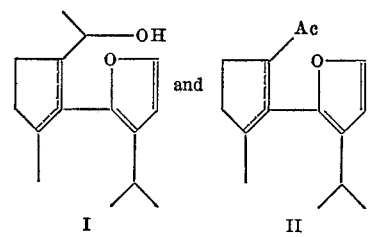

I  II wherein the double bond of the cyclopentene ring is represented by one of the dotted lines.

4. Process for the preparation of acetylcyclopentenylfuran derivatives of formula

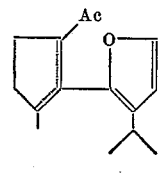

II wherein the double bond of the cyclopentene ring is represented by one of the dotted lines, which comprises cyclizing 2-(1,6-dioxo-2-methylheptyl) - 3 - isopropylfuran by means of a cyclization agent comprising a solution of a strong inorganic base in water or in a mixture of water and an alcohol, or an alkali-metal alkoxide dissolved in an ordinary polar solvent.

5. Process according to claim 4 which comprises using a methanol-water solution of sodium hydroxide and operating at reflux temperature for two to ten hours.

6. 2-(1,6-dioxo-2-methylheptyl)-3-isopropylfuran.

7. Process for the preparation of 2-(1,6-dioxo-2-methylheptyl)-3-isopropylfuran X which comprises:
   (a) condensing isobutyrylacetaldehyde dimethylacetal III with methyl chloroacetate in the presence of sodium methoxide to methyl 5-dimethoxy-2,3-epoxy-3-isopropylvalerate IV,
   (b) converting epoxyester acetal IV to 2-methoxycarbonyl-3-isopropylfuran V by heat,
   (c) converting 2-methoxycarbonyl-3-isopropylfuran V to the corresponding acid chloride VI, via alkaline hydrolysis of V to the corresponding free acid and subsequent chlorination of said acid with thionyl chloride,
   (d) acylating cyclopentanone morpholine enamine with acid chloride VI and subsequently hydrolysing the product to 2-(3-isopropyl-2-furoyl)-cyclopentanone VII, (e) treating VII with sodium hydride and methylating the product with methyl iodide to 2-methyl-2-(3-isopropyl-2-furoyl)-cyclopentanone VIII, (f) converting VIII into 1,2-dimethyl-2-(3-isopropyl-2-furoyl)-cyclopentanol IX by adding methylmagnesium iodide to VIII and hydrolyzing the resulting organomagnesium compound, and (g) cleaving the 5-membered carbon ring of IX by alkali.

References Cited

House, Herbert O., Modern Synthetic Reactions (1965), New York, W. A. Benjamin, Inc., p. 40.

ALEX MAZEL, Primary Examiner

B. T. DENTZ, Assistant Examiner

U.S. Cl. X.R.

252—522

PO-1050
(5/69)

UNITED STATES PATENT OFFICE
CERTIFICATE OF CORRECTION

Patent No. 3,584,013                        Dated June 8, 1971

Inventor(s) George H. Büchi, Charles Pascal Giannotti, Edgar Lederer and Hans Wüst It is certified that error appears in the above-identified patent and that said Letters Patent are hereby corrected as shown below:

| Column | Line | Correction |
|---|---|---|
| 4 | 35 | change "NaN" to --NaH-- |
| 4 | 43 | double bond is missing in drawing of formula X  Correct formula follows: |

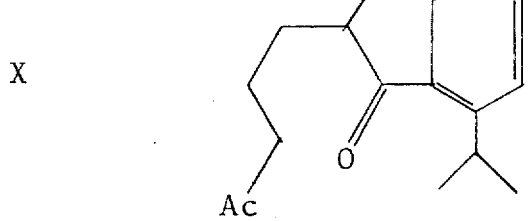

| | | |
|---|---|---|
| 8 | 14 | change "Amylicinnamaldehyde" to --Amylcinnamaldehyde-- |
| 8 | 19 | add superscript 1 referring to footnote to read --Styrax, purified, at 50%[1]-- |
| 8 | 27 | change "aVnillin" to --Vanillin-- |
| 8 | 66 | change "Dedecanel" to --Dodecanal-- |

Signed and sealed this 4th day of January 1972.
(SEAL)
Attest:

EDWARD M. FLETCHER, JR.           ROBERT GOTTSCHALK
Attesting Officer                 Acting Commissioner of Patents